United States Patent
Ono et al.

(10) Patent No.: US 7,369,908 B2
(45) Date of Patent: May 6, 2008

(54) METHOD FOR MANUFACTURING PRODUCT FORMED WITH A PLURALITY OF PARTS AND METHOD FOR COMBINING PARTS

(75) Inventors: Makoto Ono, Yokohama (JP); Yoichi Nonaka, Yokohama (JP); Hisaya Ishibashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 44 days.

(21) Appl. No.: 11/513,377

(22) Filed: Aug. 31, 2006

(65) Prior Publication Data

US 2006/0293775 A1    Dec. 28, 2006

(51) Int. Cl.
*G06F 19/00* (2006.01)

(52) U.S. Cl. ............ 700/97; 700/99; 700/103; 700/109; 705/7

(58) Field of Classification Search ............ 700/97, 700/99, 103, 109; 705/7
See application file for complete search history.

(56) References Cited

U.S. PATENT DOCUMENTS

| | | | | |
|---|---|---|---|---|
| 5,956,251 | A * | 9/1999 | Atkinson et al. | 700/109 |
| 7,151,974 | B2 * | 12/2006 | Hayashi | 700/101 |
| 7,219,068 | B2 * | 5/2007 | Zelek et al. | 700/97 |

FOREIGN PATENT DOCUMENTS

| | | |
|---|---|---|
| JP | 11-339089 | 12/1999 |
| JP | 2000-114130 | 4/2000 |
| JP | 2002-318617 | 10/2002 |
| JP | 2004-077188 | 3/2004 |
| JP | 2004-145390 | 5/2004 |
| JP | 2004-199501 | 7/2004 |

OTHER PUBLICATIONS

"The Development of Real Time Fault Prognostics System using MT-system" by 2003, Teshima, et al.pp. 226-229.
"A Pratical Approach for Interpretating Multivariate T2 Control Chart Signals" by Mason, et al., Journal of Quality Technology, vol. 29, No. 4, Oct. 1997.
"Analysis of Mahalanobis distance in MTS—The calculation process and equation" by M. Nakatsugawa, et al., Oct. 2000., vol. 8, No. 5.

* cited by examiner

*Primary Examiner*—Leo Picard
*Assistant Examiner*—Steven R. Garland
(74) *Attorney, Agent, or Firm*—Mattingly, Stanger, Malur & Brundidge, PC

(57) ABSTRACT

A parts-combining method having high quality or yield for a product having a large number of parts. First entering an identification number group of nondefective completed products, a table of a product identification number group and a parts identification number group, a characteristic data group of parts A with respect to identification numbers of the parts A and a characteristic data group of parts B with respect to identification numbers of the parts B, and calculating a nondefective product space. Before a new product is manufactured, entering a characteristic data group of parts A with respect to identification numbers of the parts A and a characteristic data group of parts B with respect to identification numbers of the parts B, and conducting calculations on statistical distances and combinatorial computations between the parts. Finally outputting a combination table having the identification numbers of both the parts A and the parts B.

8 Claims, 11 Drawing Sheets

FIG.5

```
P00113521,Good
P00113522,F001
P00113523,Good
P00113524,Good
P00113525,F002
P00113526,F001
P00113527,Good
P00113528,Good
P00113529,F002
P00113530,F002
P00113531,Good
P00113532,Good
P00113533,Good
P00113534,Good
P00113535,F001
P00113536,Good
P00113537,Good
P00113538,F002
P00113539,Good
P00113540,Good
```

$$\left.\begin{array}{l}
1.53,\ 20.1,\ 3322,\ 103.2,\ 0.053\\
1.50,\ 19.8,\ 3325,\ 104.3,\ 0.049\\
1.49,\ 18.9,\ 3326,\ 107.2,\ 0.050\\
1.51,\ 19.0,\ 3328,\ 103.1,\ 0.051\\
1.54,\ 20.0,\ 3321,\ 106.5,\ 0.058\\
1.53,\ 19.2,\ 3327,\ 102.3,\ 0.048\\
1.52,\ 19.1,\ 3320,\ 107.3,\ 0.051\\
1.53,\ 19.7,\ 3323,\ 112.2,\ 0.049\\
1.49,\ 19.2,\ 3325,\ 102.5,\ 0.052\\
1.50,\ 19.3,\ 3328,\ 109.3,\ 0.051\\
1.53,\ 18.5,\ 3330,\ 103.4,\ 0.049\\
1.48,\ 19.0,\ 3320,\ 102.5,\ 0.053\\
1.43,\ 20.0,\ 3325,\ 108.3,\ 0.050
\end{array}\right\}171$$

Mean values  1.51, 19.4, 3324, 105.5, 0.051  —172

Standard deviations  0.030, 0.427, 3.223, 3.154, 0.0026  —173

FIG.10

$$\begin{pmatrix}
1 & 0.067276 & -0.04254 & -0.08993 & 0.165273\\
0.067276 & 1 & -0.19743 & 0.222023 & 0.259308\\
-0.04254 & -0.19743 & 1 & -0.12494 & -0.56274\\
-0.08993 & 0.222023 & -0.12494 & 1 & -0.08490\\
0.165273 & 0.259308 & -0.56274 & -0.08490 & 1
\end{pmatrix}$$

FIG.12
B20031,103.1,0.052
B20033,102.5,0.045
B20035,106.6,0.048
B20036,105.3,0.059
FIG.13
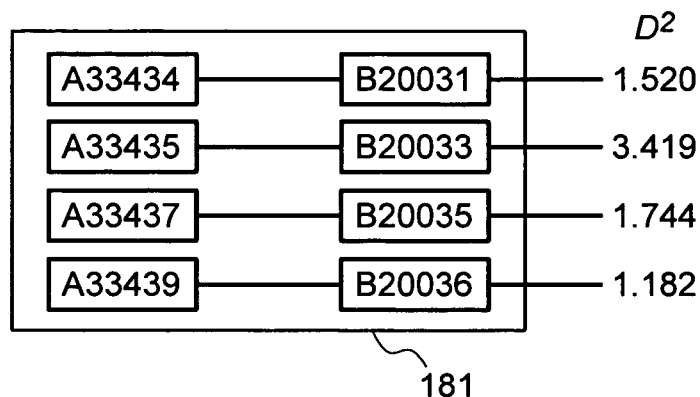
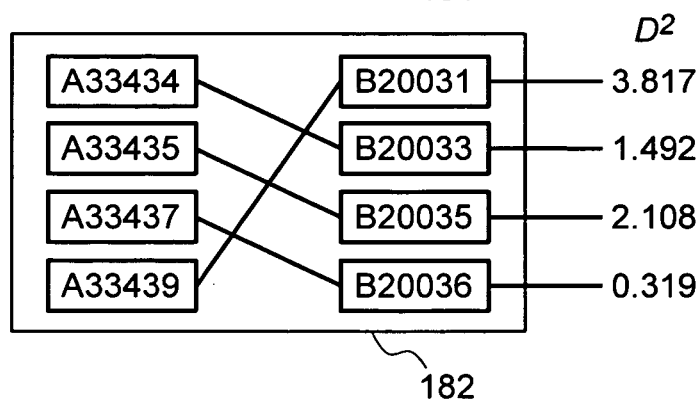
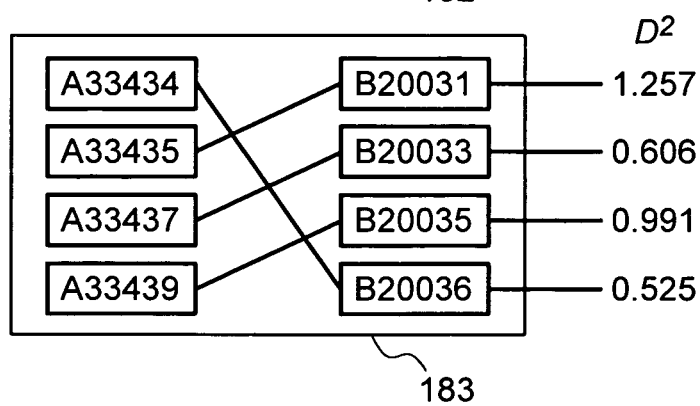

METHOD FOR MANUFACTURING PRODUCT FORMED WITH A PLURALITY OF PARTS AND METHOD FOR COMBINING PARTS

BACKGROUND OF THE INVENTION

The present invention relates to a method of manufacturing a product formed with a large number of parts, such as a magnetic storage device, a multi-chip module, liquid-crystal display device, printed circuit board, automobile, or electrical household appliance.

Manufacturing processes for a high-technology hardware product such as a magnetic storage device, multi-chip module, or liquid-crystal display device, generally consist of the parts-forming processes that require thin-flim forming, polishing, and other fine processing, and an assembly process for assembling completed parts. A magnetic storage device, for example, is manufactured by forming its major components, namely, a plurality of magnetic heads and disks in different parts-forming processes and then assembling each magnetic head and disk with a spindle motor, a frame, and other components in an assembly process to complete the device as a product. Also, a multi-chip module is manufactured by forming a plurality of chips on individual wafers in a parts-forming process and then extracting chips from different wafers, mounting the extracted chips mixedly on a wiring substrate or the like, connecting the wiring, and sealing all necessary sections with resin, ceramics, or the like, in an assembly process to complete the device as a product.

During the parts-forming processes and assembly process for manufacturing such a high-technology device, many characteristic values of its components are measured and managed using a technique referred to as SPC (Statistical Process Control). This technique is described in related literature such as "How to Create and Utilize Better Control Charts", a book published by the Japanese Standards Association in 2001, "W. A. Levinson: Statistical Process Control in Microelectronics Manufacturing, Semiconductor International, November, pp. 95-102 (1994)", and "L. S. Nelson: Interpreting Shewhart X-bar Control Charts, Journal of Quality Technology, Vol. 17, No. 2, pp. 114-116 (1985)". SPC is used to analyze changes in chronologically arranged characteristic data and judge whether process abnormalities are occurring, and each characteristic value is independently managed during SPC.

However, it may be difficult to manage each characteristic value independently, and thus, alternative methods to SPC have been proposed. These alternative methods are intended to implement quality control that includes product defect detection, by converting each of process-by-process characteristic data measurements into Mahalanobis distance, a single evaluation measure, or into a statistical distance called Hotelling T2 or the like. The alternative methods are described in Japanese Patent Laid-Open Nos. 2000-114130, 2002-318617, Hei 11-339089, 2004-77188, and 2004-199501, and in related literature such as "Shoh-ichi Tejima and Masahiro Azemoto: Development of a Real-Time Monitoring and Diagnosing System Based on MT System Technology, 11th Quality Engineering Research Papers Presentation Convention, Quality Engineering Society of Japan, pp. 226-229 (2003)", "Technological Development in MT Systems", a book published by the Japanese Standards Association, "R. L. Mason: A Practical Approach for Interpreting Multivariate T2 Control Chart Signals, Journal of Quality Technology, Vol. 29, No. 4, pp. 396-406 (1997)", and "Masashi Nakatsugawa, Masato Yamamoto, and Azuma Oh-uchi: The Mahalanobis Distance in MTS, Quality Engineering, Vol. 8, No. 5, pp. 19-26 (2000)".

The present inventors considered it possible to realize the manufacture of a less expensive product with maintained high quality or high yield by applying any one of the above-mentioned statistical distances to production control. As far as the inventors were able to examine, Japanese Patent Laid-Open No. 2004-145390 was confirmed that describes an example of application of a statistical distance to production control. A method of controlling production by applying a statistical distance to the adjustment of manufacturing process parameters is described in Japanese Patent Laid-Open No. 2004-145390.

In recent years, magnetic storage devices, multi-chip modules, liquid-crystal display devices, printed circuit boards, and other high-technology devices have become more sophisticated in manufacturing process and are facing a situation under which, even if individual components satisfy predefined characteristic data, a completed product does not always become a nondefective product without fail.

SUMMARY OF THE INVENTION

An object of the present invention is to provide a technique for controlling a charge of parts by firstly quantifying appropriateness levels of combinations between a plurality of parts to be built into one product, and then predicting combinations expected to achieve high quality or a high yield.

In order to achieve the above object, the present invention provides a method for manufacturing a product formed with a plurality of parts, the method comprising the steps of: after reading identification numbers of the parts, storing the identification numbers in association with the parts; after the plurality of parts have been built into the product, storing the identification numbers of the parts in association with an identification number of the product; after reading out characteristic values of the parts from the storage means by use of an identification number of a product which has already been completed and judged to be a nondefective product, calculating a nondefective product space beforehand from the characteristic values that have been read out; before a new product is manufactured, providing association among characteristic values of a plurality of parts scheduled to be built into the new product and calculating a statistical distance from the associated characteristic values and the nondefective product space; and determining a combination of the two sets of parts such that the statistical distance is minimized.

More specifically, the above method is constructed as described in "Claims".

According to the present invention, it is possible to realize production with high product quality or a high yield in comparison with any conventional production methods by digitizing the appropriateness levels of combinations between parts and determining a combination between the parts, and thus to save manufacturing costs.

BRIEF DESCRIPTIONS OF THE DRAWINGS

FIG. 5 is a diagram showing an example of an identification number group of nondefective products;

FIG. 6 is a diagram showing an example of an association table of a product identification number group and a parts identification number group;

FIG. 7 is a diagram showing an example of a characteristic data group of parts A with respect to identification numbers of the parts A;

FIG. 8 is a diagram showing an example of a characteristic data group of parts B with respect to identification numbers of the parts B;

FIG. 9 is a diagram showing an example of calculation results on mean values and on standard deviations;

FIG. 10 is a diagram showing an example of calculation results on a correlation matrix;

FIG. 11 is a diagram showing another example of a characteristic data group of parts A with respect to identification numbers of the parts A;

FIG. 12 is a diagram showing yet another example of a characteristic data group of parts B with respect to identification numbers of the parts B;

FIG. 13 is a diagram showing an example of calculation results on combinations of the parts A and B and on statistical distances;

DETAILED DESCRIPTIONS OF PREFFERED EMBODIMENTS

Embodiments of the present invention will be described hereunder using the accompanying drawings. First, a generalized embodiment will be described in "(First Embodiment)". Next, an embodiment of applying the present invention to a magnetic storage device will be described in "(Second Embodiment)". In addition, an embodiment of applying the present invention in a simplified fashion when a nondefective product space cannot be calculated beforehand will be described in "(Third Embodiment)".

(First Embodiment)

Figure 2:
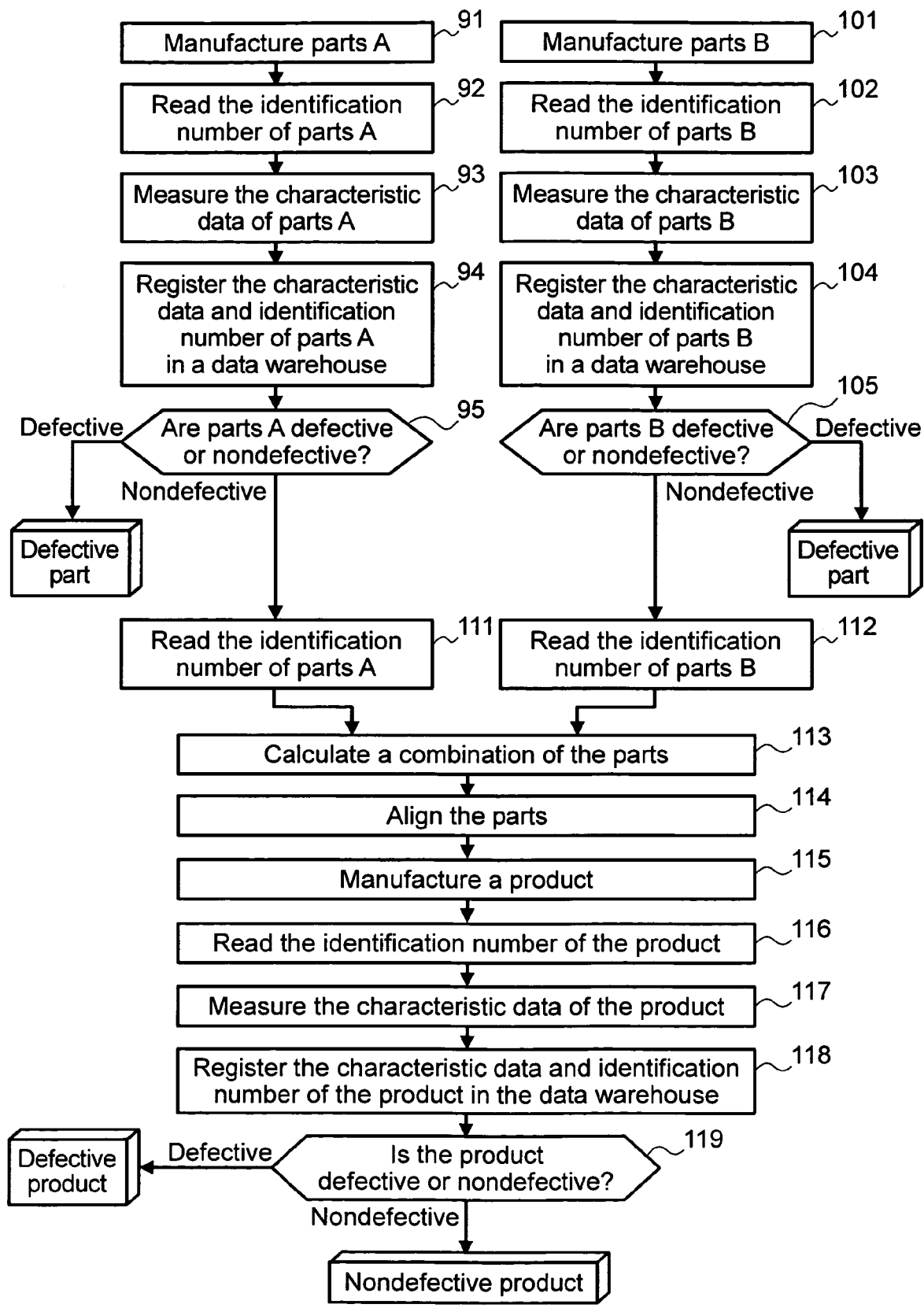
FIG. 2 is a diagram that shows an example of a flowchart of manufacturing process steps for a product which applies the present invention.

FIG. 2 is a diagram that shows an example of a flowchart of manufacturing process steps for products which are completed by manufacturing parts A and parts B independently and assembling the two kinds of parts as major components of a product. The parts A are manufactured in step 91, identification numbers (serial numbers) of the parts A are read in step 92, and characteristic data of the parts A is measured in step 93. In step 94, the identification numbers of the parts A that have been read in step 92 and the characteristic data of the parts A that has been measured in step 93 are registered in a data warehouse. Next, step 95 is executed to judge whether the parts A are defective or nondefective. If any parts A are judged to be nondefective in step 95, only those parts A are transferred for processing to step 111. Similarly to parts A, parts B are manufactured in step 101, identification numbers of the parts B are read in step 102, and characteristic data of the parts B is measured in step 103. In step 104, the identification numbers of the parts B that have been read in step 102 and the characteristic data of the parts B that have been measured in step 103 are registered in the data warehouse. Next, step 105 is executed to judge whether the parts B are defective or nondefective. If any parts B are judged to be nondefective in step 105, only those parts B are transferred for processing to step 112. After the judgments, the two kinds of parts A and B are sent to a process site for completing the product. First, the identification numbers of the parts A and B are read in steps 111 and 112, respectively. Next, parts combinatorial calculation according to the present invention is conducted in step 113. Each part is aligned in step 114 in accordance with the calculation results obtained in step 113, and the product is manufactured in step 115. Next, an identification number of the product is read in step 116, characteristic data of the product is measured in step 117, and the identification number of the product that has been read in step 116 and characteristic data of the product that has been measured in step 117 are registered in the data warehouse. Finally, step 119 is executed to judge whether the product is defective or nondefective. The product, only if judged to be nondefective in step 119, will be shipped.

Figure 3:
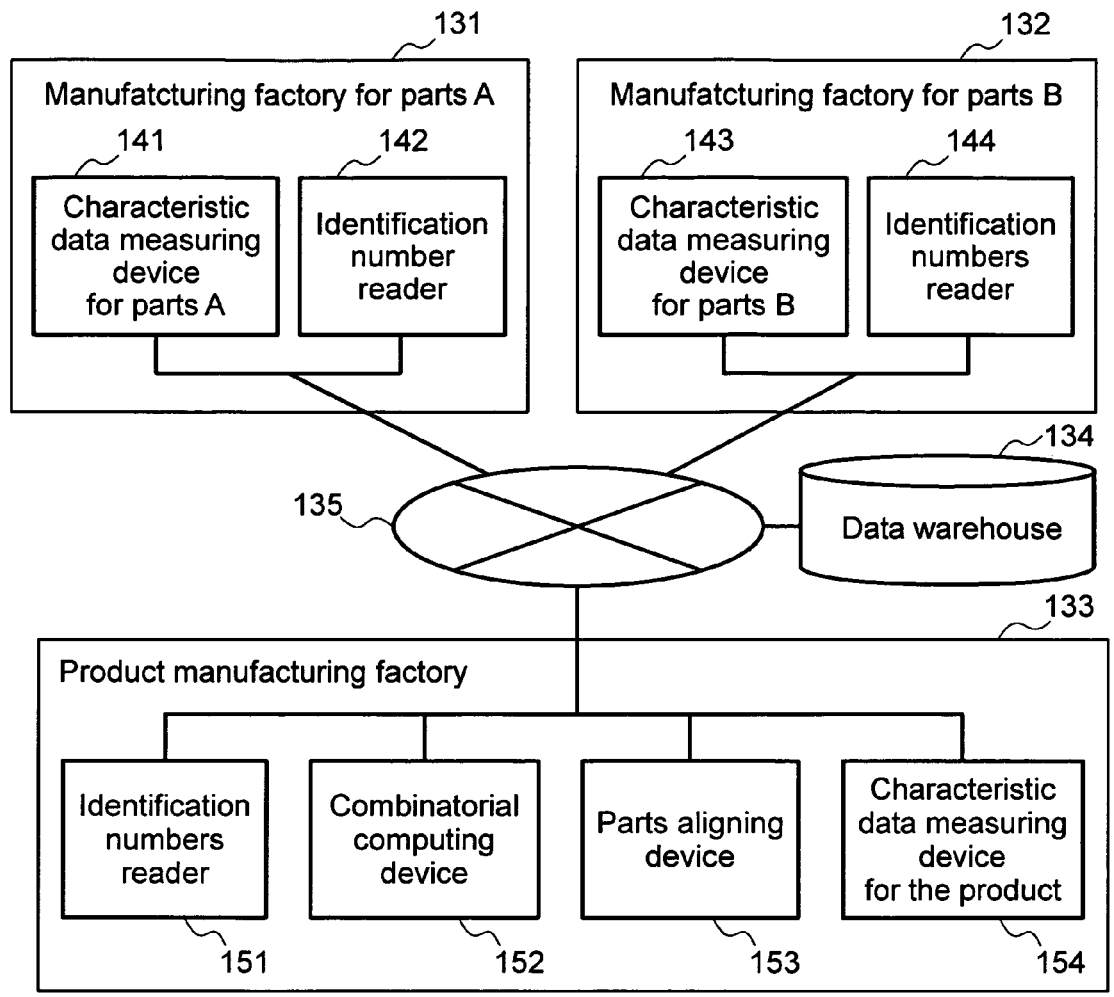
FIG. 3 is a diagram showing an example of a hardware configuration for implementing the manufacture in FIG. 2.

FIG. 3 is a block diagram showing an example of a hardware configuration for implementing the present invention. Reference number 131 denotes a manufacturing factory for parts A, 132 denotes a manufacturing factory for parts B, and 133 denotes a manufacturing factory for products each including the parts A and B as major components. The factory 131 has at least a characteristic data measuring device 141 for the parts A and an identification number reader 142 for the parts. Similarly, the factory 132 has at least a characteristic data measuring device 143 for the parts B and an identification number reader 144 for the parts. The factory 133 has at least an identification number reader 151, a combination computing device 152 based on the present invention, a parts aligning device 153, and a product characteristic data measuring device 154. These devices located in the factories 131, 132, and 133 are interconnected via a network 135, data warehouse 134 is likewise connected to each device via the same network, and characteristic data, identification numbers, and other data are exchanged between the devices and the data warehouse 134. More specifically, characteristic data that has been measured by the measuring devices 141, 143, 154, and identification numbers that have been read by the identification number readers 142, 144, 151, are stored into the data warehouse 134 via the network. Also, the combination computing device 152 retrieves stored characteristic data, identification numbers, and other data from the data warehouse 134 and uses the retrieved data effectively to determine a combination of the parts.

Figure 4:
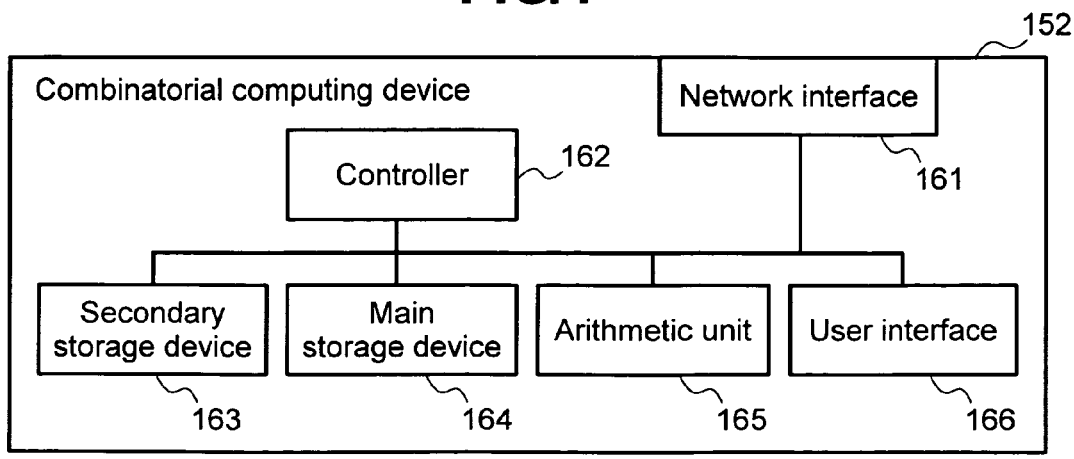
FIG. 4 is a diagram showing an example of a combinatorial computing device which applies the present invention.

FIG. 4 is an example of a block diagram showing a configuration of the combination computing device 152 of FIG. 3. The combination computing device 152 is a general computer that can be connected to the network by having a network interface 161, a controller 162, a secondary storage device 163, a main storage device 164, an arithmetic unit 165, a user interface 166, and others.

Figure 1:
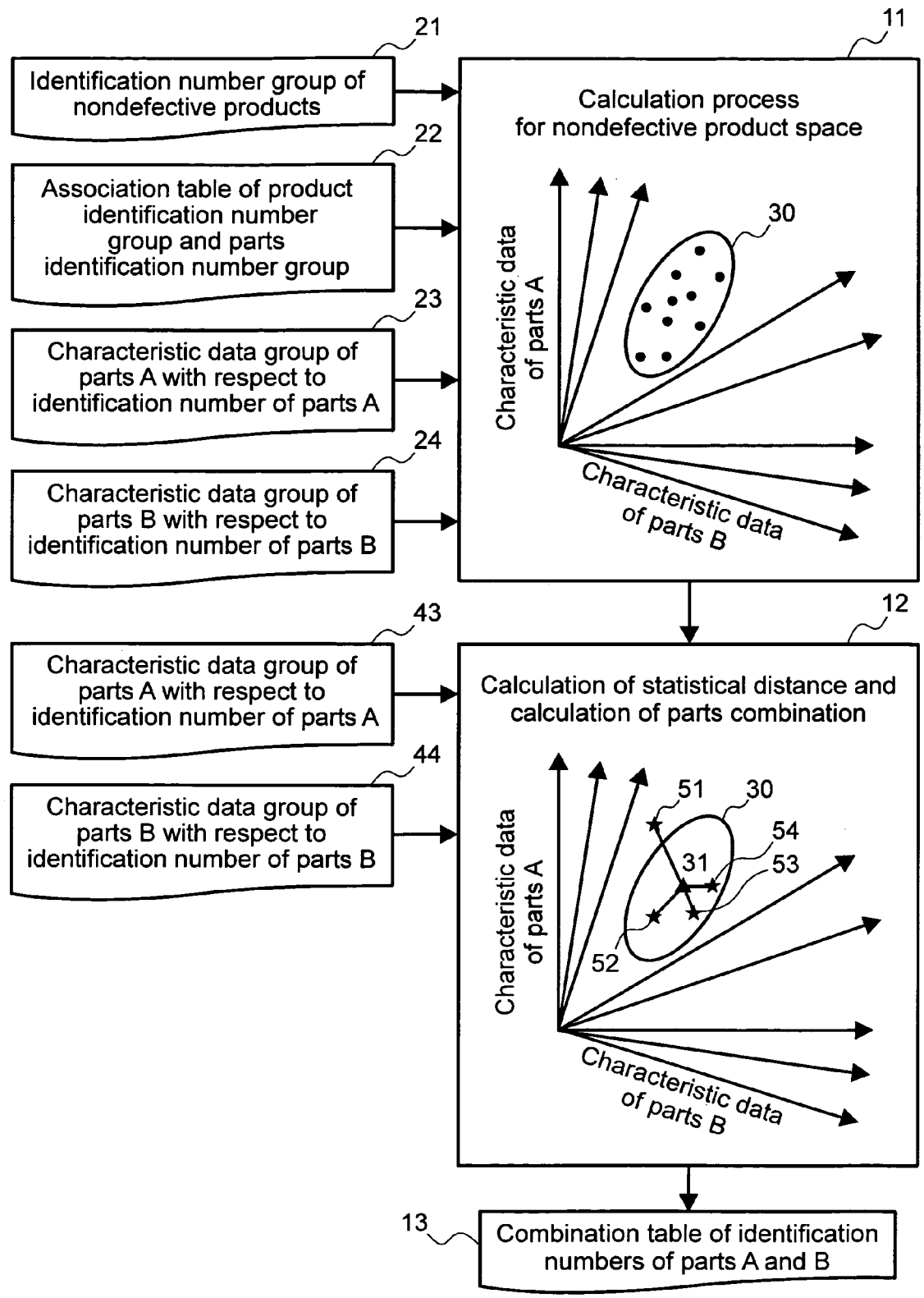
FIG. 1 is a diagram showing an example of a processing procedure of the present invention.

FIG. 1 shows an example of a processing procedure to be used to apply the present invention to the combinatorial calculation of parts in step 113 of FIG. 2. Before executing step 113, the combination computing device 152 first acquires an identification number group 21 of nondefective products, an association table 22 of a products identification number group and a parts identification number group, a characteristic data group 23 of parts A with respect to the identification numbers the parts A, and a characteristic data group 24 of parts B with respect to the identification numbers of the parts B, from the data warehouse 134. Next before executing step 113, the combination computing device 152 executes a calculation process 11 for a nondefective product space.

The calculation process 11 for a nondefective product space is described below. For example, if the number of samplings of products whose nondefectiveness is already confirmed is taken as "n" ("n" number of events), when a sum of the number of characteristic data items on the parts A and the number of characteristic data items on the parts B is taken as "k", mean values "m1", "m2", etc. up to "mk", of k-dimensional vector components "x ij" (i=1,2, . . . ,k; j=1,2, . . . ,n) are calculated as follows using (Formula 1):

(Formula 1)

$$m_i = \frac{1}{n}\sum_{j=1}^{n} x_{ij} \quad (i = 1, 2, \ldots, k) \quad (1)$$

Also, standard deviations "σ1", "σ2", etc. up to "σk" are calculated as follows using (Formula 2):

(Formula 2)

$$\sigma_i = \sqrt{\frac{1}{n}\sum_{j=1}^{n}(x_{ij} - m_i)^2} \quad (i = 1, 2, \ldots, k) \quad (2)$$

In accordance with (Formula 3), the k-dimensional vector components "x ij" are normalized using a mean value "mi" and a standard deviation "σi".

(Formula 3)

$$X_{ij} = \frac{x_{ij} - m_i}{\sigma_i} \quad \begin{array}{l}(i = 1, 2, \ldots, k)\\(j = 1, 2, \ldots, n)\end{array} \quad (3)$$

A correlation between normalized items is derived using a normalized item "Xij". A correlation coefficient between normalized items "i1" and "i2" can be calculated per (Formula 4).

(Formula 4)

$$r_{i_1}r_{i_2} = \frac{1}{n}\sum_{j=1}^{n} X_{i_1 j} X_{i_2 j} \quad (i_1, i_2 = 1, 2, \ldots, k) \quad (4)$$

Thus, a correlation matrix R between the normalized items is finally calculated in the calculation process 11.

(Formula 5)

$$R = \begin{pmatrix} 1 & r_{12} & \ldots & r_{1k} \\ r_{21} & 1 & \ldots & r_{2k} \\ \ldots & \ldots & & \ldots \\ \ldots & \ldots & & \ldots \\ \ldots & \ldots & & \ldots \\ r_{k1} & r_{k2} & \ldots & 1 \end{pmatrix} \quad (5)$$

That is to say, in FIG. 1, a distribution 30 of the products which have finally become nondefectives is equivalent to a nondefective product space in a k-dimensional scatter diagram of the characteristic data groups of the parts A and B.

Next, when the parts A and B are actually supplied for manufacturing products, calculations, shown in FIG. 1, on statistical distances and combinatorial computations between the parts are conducted as a calculation process 12 in step 113 shown in FIG. 2. In step 113, a characteristic data group 43 of the parts A with respect to the identification numbers of the parts A and a characteristic data group 44 of the parts B with respect to the identification numbers of the parts B are first input, and then the calculation process 12 is executed. More specifically, the above calculation of statistical distances refers to calculating a square of D for each combination of the parts A and B in accordance with (Formula 6).

(Formula 6)

$$D^2 = \frac{1}{k} X^T R^{-1} X \quad (6)$$

In formula 6, X is a column vector generated by normalizing the characteristic data of a certain part A and that of a certain part B by use of (Formula 3), XT is a row vector generated by transposing the column vector, and R-1 is an inverse matrix of the correlation matrix R. In FIG. 1, D² is a value determined in (Formula 6) as the statistical distance from a triangular plot 31 which is a center of a nondefective product space 30 to either plot 51, 52, 53, or 54, depending on a particular combination of the parts A and B. If all the latter four plots are less than a given threshold value, it can be predicted that all products manufactured using the parts will be nondefective products. Conversely if the four plots are greater than the threshold value, it can be predicted that the product manufactured using the particular combination of the parts will be defective. Calculating the above statistical distance for various combinations of parts A and B is followed by calculating an optimal combination to obtain the largest possible number of nondefective products. Finally, an optimal combination table 13 of the identification numbers of the parts A and B is output and the parts A and B are sent for processing to step 114 of FIG. 2.

Next, various data that will be actually entered, and related processing results will be described below using examples. FIGS. 5 to 8 each show an example of data entry in step 11.

Figures 5, 6:
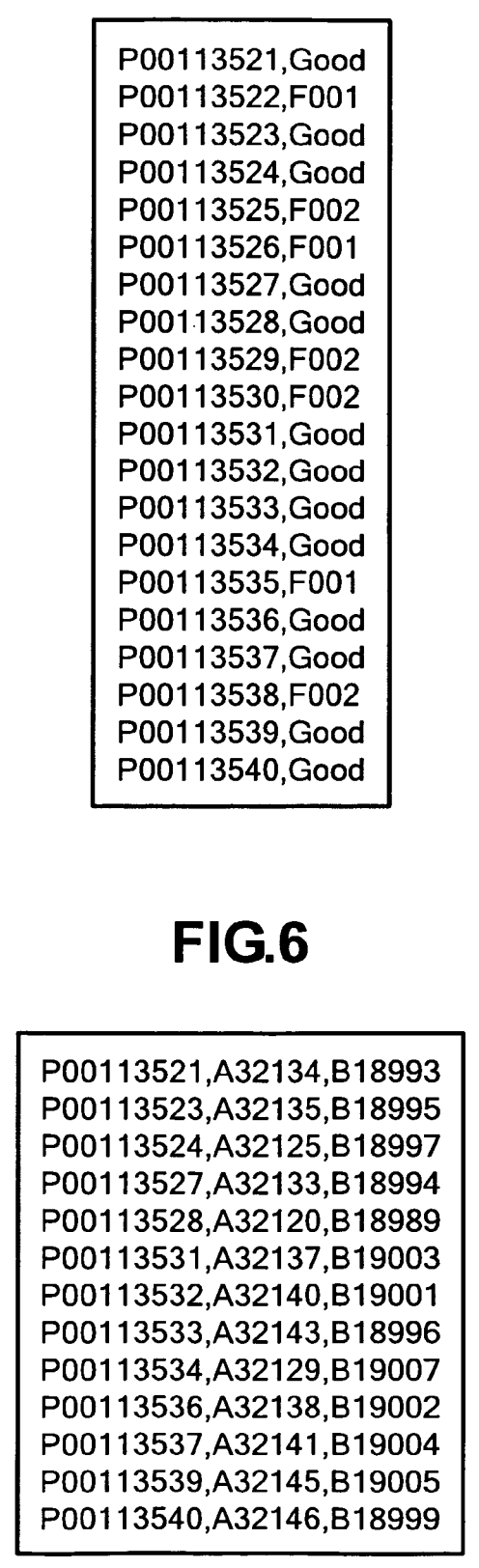

FIG. 5 shows an example of an identification number group 21 of nondefective products. Product identification numbers and information which indicates whether the particular product is a nondefective or defective product are listed in this example. For example, in this list, "Good" indicating that the product is a nondefective one is assigned to identification number "P00113521", and "F001" indicating that the product is a defective one is assigned to identification number "P00113522". Although information on defective products is also listed in this example, only the identification numbers of nondefective products can be listed instead.

FIG. 6 shows an example of an association table 22 of a product identification number group and a parts identification number group. Product identification numbers and the identification numbers of the parts A and B which were assembled into the particular product are listed in this example. It can be seen in this example that a part A with identification number "A32134" and a part B with identification number "B18993" were assembled into product "P0013521" and that a part A with identification number "A32135" and a part B with identification number "B18995" were assembled into product "P0013523".

Figures 7, 8:
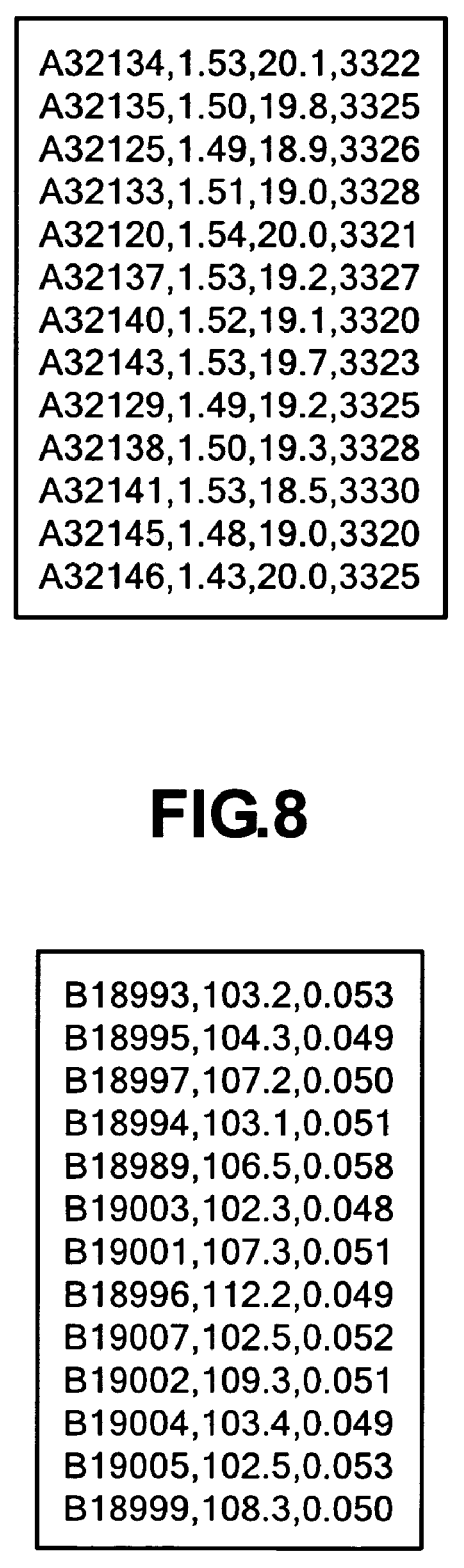

FIG. 7 shows an example of a characteristic data group of parts A with respect to identification numbers of the parts A. The identification numbers of each part A and the characteristic data thereof that was measured in step 93 are listed in this example. It can be seen in this example that the characteristic data of a part A with identification number "A32134" includes a first characteristic value of "1.53", a second characteristic value of "20.1", and a third characteristic value of "3322".

FIG. 8 is a diagram showing an example of a characteristic data group 24 of parts B with respect to identification numbers of the parts B. The identification numbers of each part B and the characteristic data thereof that was measured in step 103 are listed in this example. It can be seen in this example that the characteristic data of a part B with identification number "B18993" includes a first characteristic value of "103.2" and a second characteristic value of "0.053". As shown by way of example in FIGS. 7 and 8, the numbers of characteristic data items are diverse.

FIG. 9 shows an example in which, after the data in FIGS. 5 to 8 was entered in step 11 of FIG. 1, mean values based on (Formula 1) were calculated first and then standard deviations based on (Formula 2) were calculated. The characteristic data in FIGS. 7 and 8, based on the association table of identification numbers in FIG. 6, are shown in tabular form as data numbered "171". Mean values that were obtained for each column of the data numbered "171" are shown as data numbered "172", and standard deviations that were obtained for each column of the data numbered "171" are shown as data numbered "173".

FIG. 10 shows calculation results on a correlation matrix R, based on normalization with (Formula 3) from the data numbered "171", "172", and "173".

FIGS. 11 and 12 show examples of data entry in step 12. The data relates to the parts that are going to be supplied to the factory 133 and assembled into a product. FIG. 11 shows another example of a characteristic data group of parts A with respect to identification numbers of the parts A, and as with FIG. 7, FIG. 11 shows in list form the identification numbers of the parts A and characteristic data thereof. FIG. 12 shows yet another example of a characteristic data group of parts B with respect to identification numbers of the parts B, and as with FIG. 8, FIG. 12 shows in list form the identification numbers of the parts B and characteristic data thereof. In this example, four parts A and four parts B are going to be supplied to the factory 133.

FIG. 13 shows an example of calculation results on statistical distances based on various combinations between the plurality of parts A in FIG. 11 and the plurality of parts B in FIG. 12. Frames 181, 182, and 183 indicate the combinations of the parts A and B. In this example, there are 24 combinations since the number of parts A and that of the parts B are both four. FIG. 13 shows three of the 24 combinations. Also, the values shown at the right side of the frames 181, 182, 183 are calculated statistical distances. Regarding the frame 181, for example, a statistical distance of "1.520" is obtained if a part A with identification number "A33434" and a part B with identification number "B20031" are combined, and a statistical distance of "3.419" is obtained if a part A with identification number "A33435" and a part B with identification number " B20033" are combined. A shorter statistical distance means that the parts combination is more likely to result in a nondefective product and that quality also improves. Hence, such combination that results in the statistical distance of "3.419" is unfit for production. For the frame 182, if a part A with identification number "A33437" and a part B with identification number "B20036" are combined, the resulting statistical distance is a small value of "0.319", from which it can be predicted that a product of high quality will be obtained. However, if a part A with identification number "A33439" and the part B with identification number "B20031" are combined, the resulting statistical distance is "3.817", which indicates that the combination is likely to result in a defective product. For the frame 183, if the part A with identification number "A33434" and the part B with identification number "B20036" are combined, the resulting statistical distance is a value of "0.525", which is larger than the statistical distance value of "0.319" in the frame 182. Even so, a maximum statistical distance value in the combinations of the frame 183 becomes "1.257", which is small, compared with other values. In the combinations of the frame 183, therefore, any of four combinations enhances a probability of a nondefective product being obtained.

As described above, combinations that reduce the value of the statistical distance on the average, as in the frame 183, are desirable for the production control that aims at a higher yield, and as an output of step 12, the combinations in the frame 183 are desirably output as the combination table 13. A method of judgment can be by selecting combinations to obtain smaller mean values of the statistical distance, or by selecting a combination that makes the maximum value of the statistical distance as small as possible to prevent a defective product from being manufactured. To manufacture top-quality products at the sacrifice of defective products occurring to a certain extent, however, it may be necessary to execute the manufacture by selecting the combinations in which a minimum statistical distance is present, as with the combinations shown in the frame 182.

As set forth above, the present invention associates the characteristic data of parts A and that of parts B to each other in accordance with the identification numbers of products as well as of the parts and quantifies appropriateness levels of the combinations between parts, as statistical distances. The parts are combined so that the statistical distances are reduced. As a result, production control with high product quality or with a high yield can be implemented.

(Second Embodiment)

Figure 14:
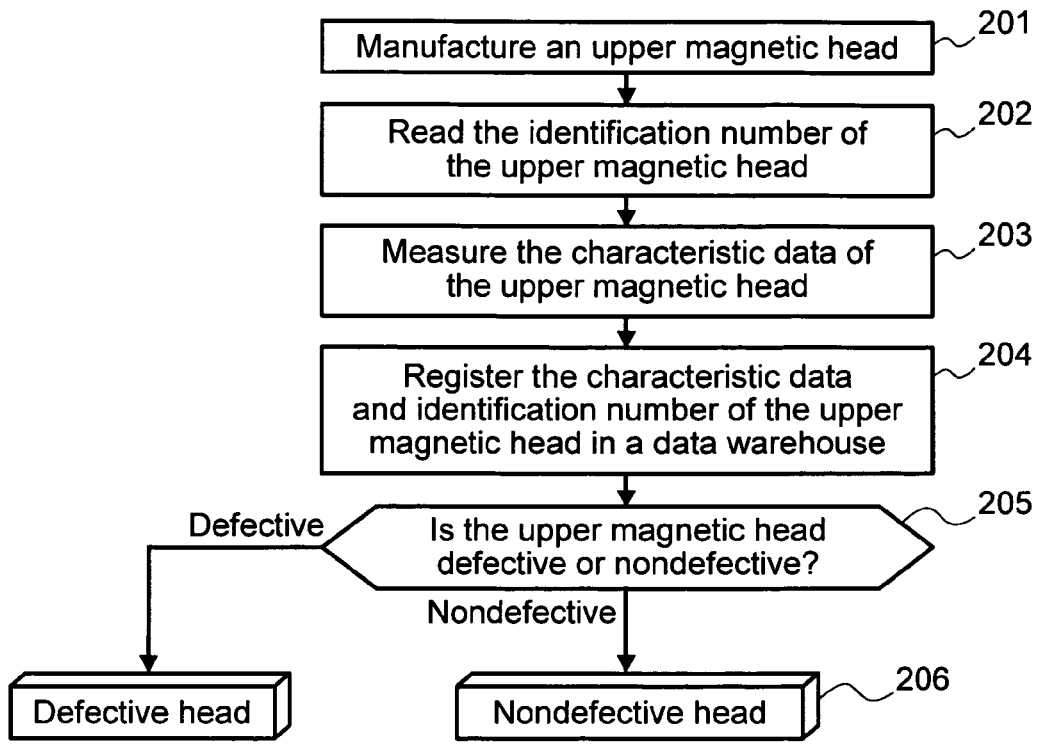
FIG. 14 is a diagram that shows an example of a flowchart of manufacturing process steps for an upper magnetic head.

Next, an embodiment of the present invention when applied to manufacturing a magnetic storage device will be described hereunder. A manufacturing process therefor will be first described using FIGS. 14 to 17. FIG. 14 shows an example of a flowchart of manufacturing process steps for a magnetic head which is a major component of the magnetic storage device. Magnetic heads can be roughly divided into upper magnetic heads for reading/writing data from an upper side of a disk, and lower magnetic heads for reading/writing data from a lower side of the disk. FIG. 14 shows an example of a flowchart of manufacturing process steps for an upper magnetic head. The upper magnetic head is manufactured in step 201, and an identification number of the upper magnetic head is read in step 202. Next, characteristic data of the upper magnetic head is measured in step 203. In step 204, the identification number that has been read in step 202, and the characteristic data that has been measured in step 203 are stored into a data warehouse. Next, whether the upper magnetic head is nondefective is judged in step 205, and the head, if judged to be nondefective, is sent as head 206 to next step.

Figure 15:
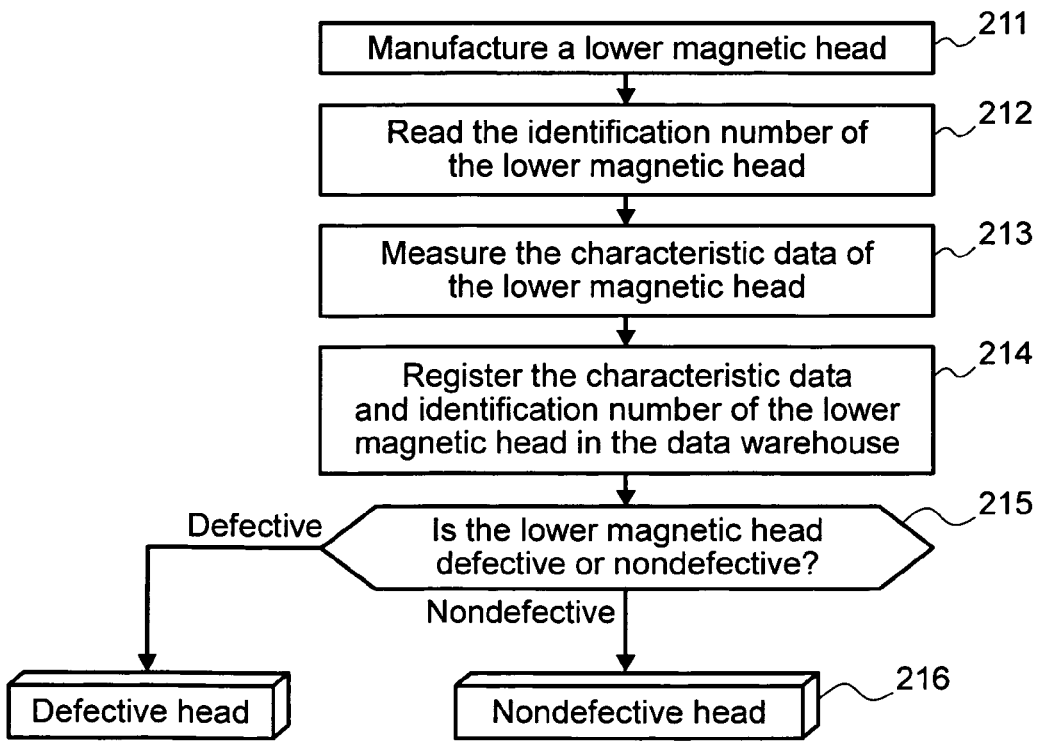
FIG. 15 is a diagram that shows an example of a flowchart of manufacturing process steps for a lower magnetic head.

FIG. 15 shows an example of a flowchart of manufacturing process steps for a lower magnetic head. The lower magnetic head is manufactured in step 211, and an identification number of the lower magnetic head is read in step 212. Next, characteristic data of the lower magnetic head is measured in step 213. In step 214, the identification number that has been read in step 212, and the characteristic data that has been measured in step 213 are stored into the data warehouse. Next, whether the lower magnetic head is nondefective is judged in step 215, and the head, if judged to be nondefective, is sent as head 216 to next step.

Figure 16:
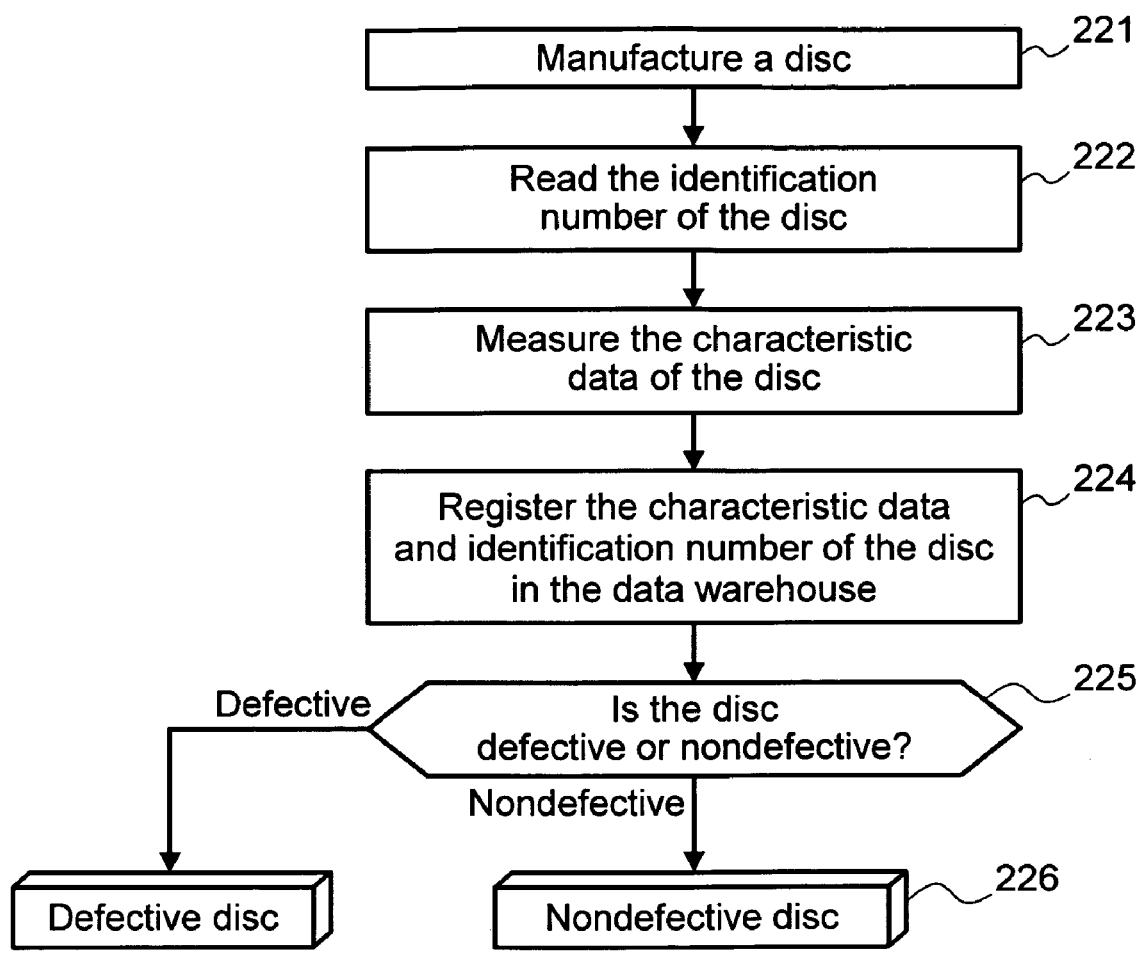
FIG. 16 is a diagram that shows an example of a flowchart of manufacturing process steps for a disk.

FIG. 16 shows an example of a flowchart of manufacturing process steps for the disk that is a major component of the magnetic storage device. The disk is manufactured in step 221, and an identification number of the disk is read in step 222. Next, characteristic data of the disk is measured in step 223. In step 224, the identification number that has been read in step 222 and the characteristic data that has been measured in step 223 are stored into the data warehouse. Next, whether the disk is nondefective is judged in step 225, and the disk, if judged to be nondefective, is sent as disk 226 to next step.

Figure 17:
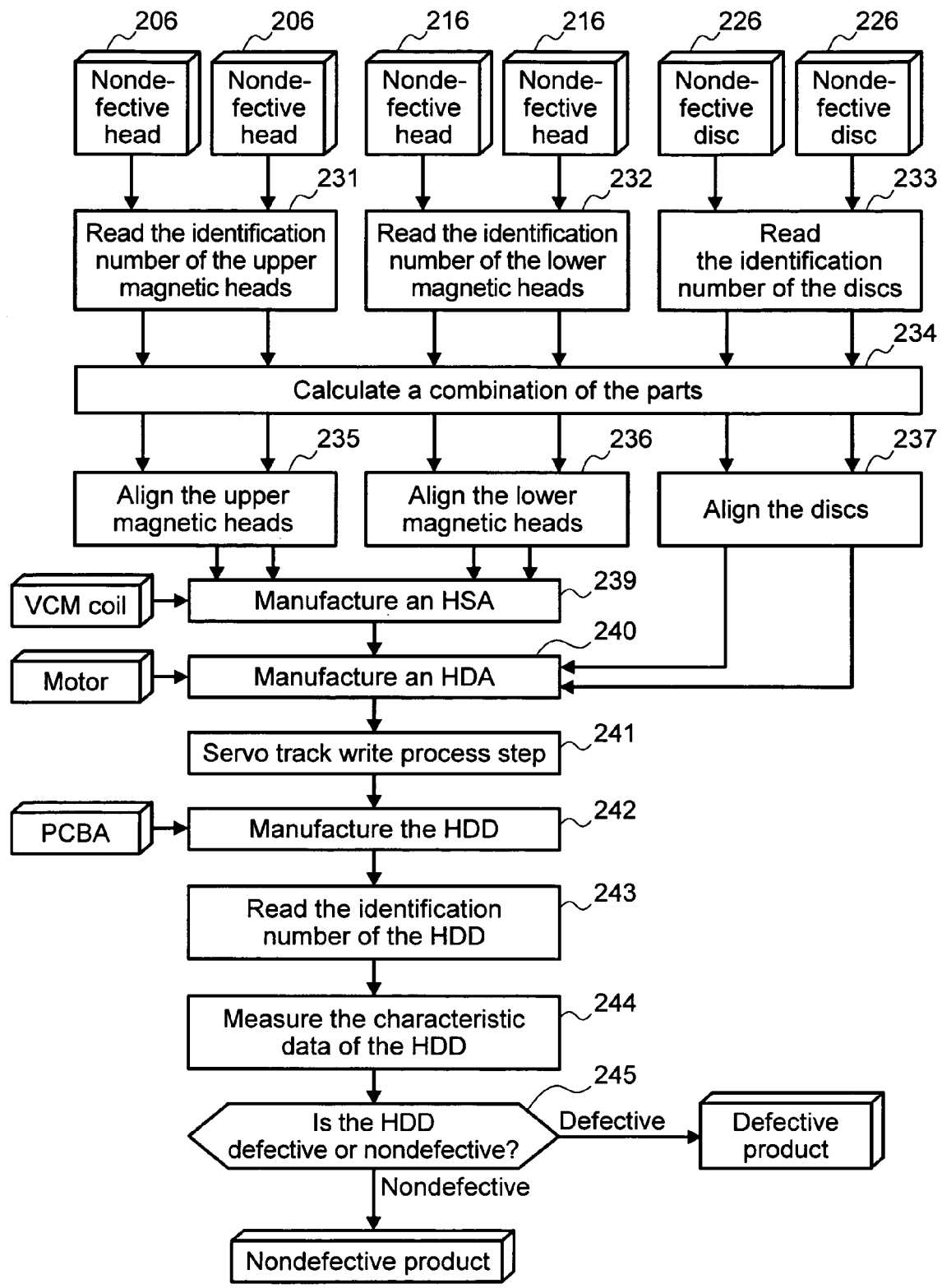
FIG. 17 is a diagram that shows an example of a flowchart of manufacturing process steps for a hard-disk drive.

FIG. 17 shows an example of a flowchart of manufacturing process steps for the magnetic storage device (HDD) itself. For HDDs, the number of magnetic heads and that of disks differ according to a particular product type. The example in FIG. 17 relates to an HDD including four magnetic heads and two disks. First in step 231, upper nondefective heads 206 are supplied and identification numbers thereof are read. Also, in step 232, lower nondefective heads 216 are supplied and identification numbers thereof are read. In addition, in step 233, nondefective disks 226 are supplied and identification numbers thereof are read. Following this, step 234 is executed to conduct parts combinatorial calculations according to the present invention. In step 235, the upper magnetic heads are aligned in accordance with a combination table that has been obtained in step 234. Similarly, in step 236, the lower magnetic heads are aligned in accordance with the combination table obtained in step 234. Similarly, in step 237, the disks are aligned in accordance with the combination table obtained in step 234. A component, called a head stack assembly (HSA) that is formed by combining several kinds of parts such as pluralities of magnetic heads, suspensions, VCM coils, and flexible printed-circuit boards, is manufactured in step 239. In step 240, several parts such as disks and spindle motors are combined with the HSA that has been manufactured in step 239, and a hard-disk assembly (HDA) is manufactured as a result. Next, in step 241, servo information is written onto each disk by using a device called a servo track writer. After that, the HDA that has been manufactured in step 240 is combined with a printed-circuit board assembly (PCBA), thereby to manufacture one HDD. An identification number of the HDD is read in step 243, and characteristic data of the HDD is measured in step 244. Finally, whether the HDD is nondefective is judged in step 245. The HDD, only if judged therein to be nondefective, will be shipped.

Figure 18:
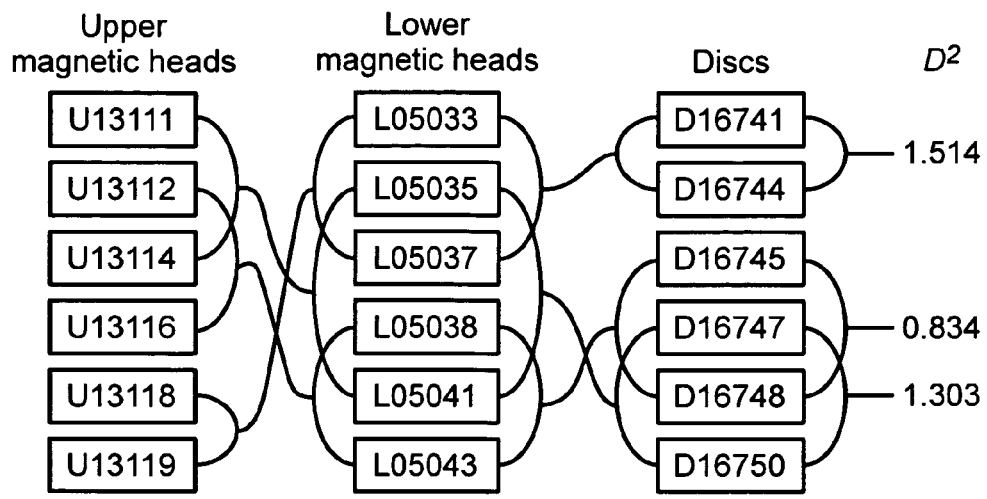
FIG. 18 is a diagram showing an example of calculation results on combinations of parts and on statistical distances.

FIG. 18 shows an example of parts combinations obtained in step 234, and associated statistical distances. In this example, six upper magnetic heads, six lower magnetic heads, and six disks are used and these parts are combined to manufacture three magnetic storage devices. In this example, several combinations are shown. One of them is a combination including, for example, upper magnetic heads having identification numbers "U13111" and "U13114", lower magnetic heads having identification numbers "L05035" and "L05041", and disks having identification numbers "D16747" and "D16750". Another combination includes, for example, upper magnetic heads having identification numbers "U13112" and "U13116", lower magnetic heads having identification numbers "L05038" and "L05043", and disks having identification numbers "D16745" and "D16748". Yet another combination includes, for example, upper magnetic heads having identification numbers "U13118" and "U13119", lower magnetic heads having identification numbers "L05033" and "L05037", and disks having identification numbers "D16741" and "D16744". If the above three combinations are used to produce three magnetic storage devices, it can be predicted that the magnetic storage devices will all be nondefective products.

(Third Embodiment)

Next, a description will be given of an embodiment which utilizes the present invention in a simplified fashion when, in the generalized product-manufacturing processes described in FIGS. 2 and 3, the number of products which have been completed as nondefectives in advance is too small for a nondefective product space to be calculated beforehand, as in a startup phase of mass production of a new device or in a test production phase thereof.

Figure 19:
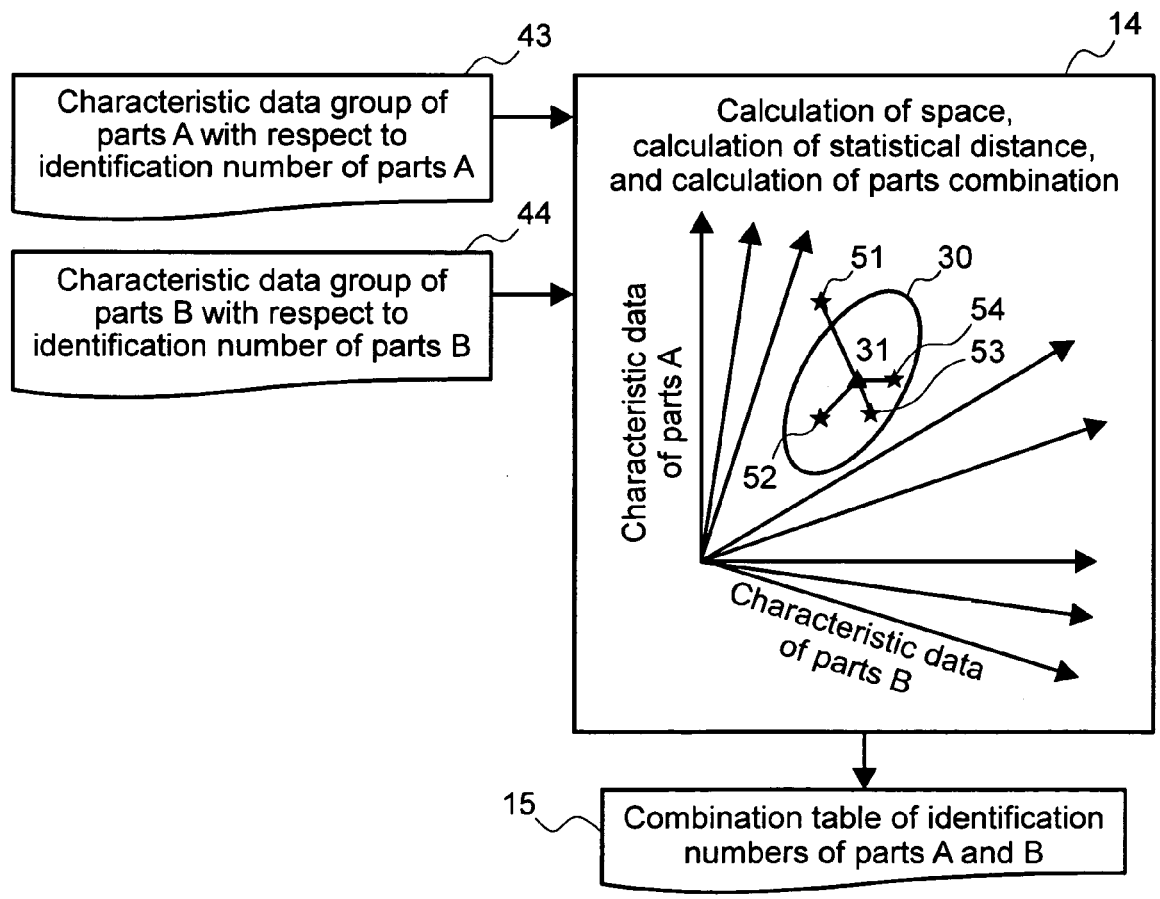
FIG. 19 is a diagram showing an example of a processing procedure to be used to utilize the present invention in a simplified fashion.

FIG. 19 shows an example of a processing procedure to be used to utilize the present invention in a simplified fashion. In a test production phase of a high-technology hardware product such as a magnetic storage device or multi-chip module, the number of products completed as nondefectives may be too small for processing to be executed in step 11. In such a case, as in step 11, mean values, standard deviations, and a correlation matrix are not calculated per (Formula 1), (Formula 2), and (Formula 5) respectively by using the characteristic data of the parts which have been assembled into a nondefective product beforehand. Instead, in step 14, mean values, standard deviations, and a correlation matrix are calculated per (Formula 1), (Formula 2), and (Formula 5) respectively, from characteristic data of new parts A and B scheduled to be assembled into a product, for each combination of the parts A and B, and then statistical distances are calculated using the above calculation results. After this, calculated statistical distance data is used to determine combinations of the parts and output a combination table 15 of identification numbers of the two kinds of parts A and B. Compared with the processing procedure shown in FIG. 1, the processing procedure in FIG. 19 lowers defective/nondefective product predicting accuracy. However, this processing procedure makes production more effective than that not involving any calculation in relation to combinations.

The invention claimed is:

1. A method for manufacturing a product formed by combining a plurality of parts, the method comprising the steps of:

storing identification numbers which uniquely identify the parts in association with characteristic values of the parts into a storage region;

after the plurality of parts have been assembled into the product, storing the identification numbers of the parts in association with an identification number of the product into the storage region;

after reading out the characteristic values of the parts from storage means by searching for the parts by an identification number of a product which has already been completed and judged to be a nondefective product, calculating a nondefective product space beforehand from the characteristic values that have been read out;

before a new product is manufactured, selecting desired combinations of the parts usable to manufacture the product from all possible combinations of the usable parts scheduled to be assembled into the product, and calculating statistical distances from the characteristic values of the usable parts and from the nondefective product space; and after adopting, from a plurality of methods of selecting a plurality of parts from the usable parts associated with the desired combinations, a selection method in which a maximum value of the statistical distances which have been calculated in relation to the usable parts within each desired combination becomes the smallest of all the statistical distances, deciding to assemble into the new product the usable parts associated with the combination which has been selected using the selection method and manufacturing the product.

2. The method according to claim 1, wherein, in the step of deciding to assemble into the new product the usable parts associated with the selected combination, a selection method that minimizes a mean value of the statistical distances which have been calculated in relation to the usable parts within the desired combinations is adopted from the plurality of methods of selecting a plurality of parts from the usable parts associated with each desired combination.

3. The method according to claim 1, wherein Mahalanobis distances are used as the statistical distances.

4. The method according to claim 2, wherein Mahalanobis distances are used as the statistical distances.

5. A method for combining parts which are assembled into a product to be formed with a plurality of parts, the method comprising the steps of:

storing identification numbers which uniquely identify the parts in association with characteristic values of the parts into a storage region;

after the plurality of parts have been assembled into the product, storing the identification numbers of the parts in association with an identification number of the product into the storage region;

after reading out the characteristic values of the parts from storage means by searching for the parts by an identification number of a product which has already been completed and judged to be a nondefective product, calculating a nondefective product space beforehand from the characteristic values that have been read out;

before a new product is manufactured, selecting desired combinations of the parts usable to manufacture the product from all possible combinations of the usable parts scheduled to be assembled into the product, and calculating statistical distances from the characteristic values of the usable parts and from the nondefective product space; and after adopting, from a plurality of methods of selecting a plurality of parts from the usable parts associated with the desired combinations, a selection method in which a maximum value of the statistical distances which have been calculated in relation to the usable parts within each desired combination becomes the smallest of all the statistical distances, deciding to assemble into the new product the usable parts associated with the combination which has been selected using the selection method and combining the selected usable parts.

6. The method according to claim 5, wherein, in the step of deciding to assemble into the new product the usable parts associated with the selected combination, a selection method that minimizes a mean value of the statistical distances which have been calculated in relation to the usable parts within the desired combinations is adopted from the plurality of methods of selecting a plurality of parts from the usable parts associated with each desired combination.

7. The method according to claim 5, wherein Mahalanobis distances are used as the statistical distances.

8. The method according to claim 6, wherein Mahalanobis distances are used as the statistical distances.

* * * * *